(12) United States Patent
Wang et al.

(10) Patent No.: US 9,350,887 B2
(45) Date of Patent: May 24, 2016

(54) SHEET CONVEYING DEVICE AND IMAGE READING APPARATUS

(71) Applicant: Brother Kogyo Kabushiki Kaisha, Nagoya (JP)

(72) Inventors: Huanfa Wang, Nagoya (JP); Takashi Ohama, Iwakura (JP)

(73) Assignee: Brother Kogyo Kabushiki Kaisha, Nagoya-Shi (JP)

( * ) Notice: Subject to any disclaimer, the term of this patent is extended or adjusted under 35 U.S.C. 154(b) by 0 days.

(21) Appl. No.: 14/822,130

(22) Filed: Aug. 10, 2015

(65) Prior Publication Data

US 2016/0050329 A1 Feb. 18, 2016

(30) Foreign Application Priority Data

Aug. 12, 2014 (JP) ................. 2014-164404

(51) Int. Cl.
| H04N 1/04 | (2006.01) |
| H04N 1/00 | (2006.01) |
| B65H 9/10 | (2006.01) |
| B65H 9/04 | (2006.01) |

(52) U.S. Cl.
CPC ............ *H04N 1/00599* (2013.01); *B65H 9/04* (2013.01); *B65H 9/101* (2013.01); *H04N 1/00559* (2013.01); *H04N 2201/0094* (2013.01)

(58) Field of Classification Search
CPC .. B65H 9/101; B65H 9/04; H04N 2201/0094; H04N 1/00599; H04N 1/00559

USPC ................... 358/498, 497, 496, 474
See application file for complete search history.

(56) References Cited

U.S. PATENT DOCUMENTS

| 2010/0252987 A1 | 10/2010 | Furuyama et al. |
| 2012/0155941 A1 | 6/2012 | Kozaki et al. |
| 2014/0167352 A1* | 6/2014 | Sakakibara ............ B65H 5/062 271/248 |
| 2015/0092255 A1* | 4/2015 | Sakakibara ........ H04N 1/00559 358/498 |

FOREIGN PATENT DOCUMENTS

| JP | 2010-245624 A | 10/2010 |
| JP | 2012-126530 A | 7/2012 |

* cited by examiner

*Primary Examiner* — Houshang Safaipour
(74) *Attorney, Agent, or Firm* — Burr & Brown, PLLC

(57) ABSTRACT

A sheet conveying device, including: a base; a conveyor for conveying a sheet; a supporter configured to be movable between a first position and a second position; a pair of regulators provided so as to protrude from respective widthwise opposite ends of the supporter and configured to regulate a position, in a widthwise direction, of the sheet supported by the supporter; a pair of engaged portions each constituted by one of a recess and a hole formed in a corresponding one of the regulators; and a pair of engaging portions protruding from the base so as to correspond to the pair of engaged portions, the engaging portions being configured to engage with the engaged portions when the supporter is located at the first position and to disengage from the engaged portions when the supporter is located at a position that is shifted from the first position toward the second position.

10 Claims, 10 Drawing Sheets

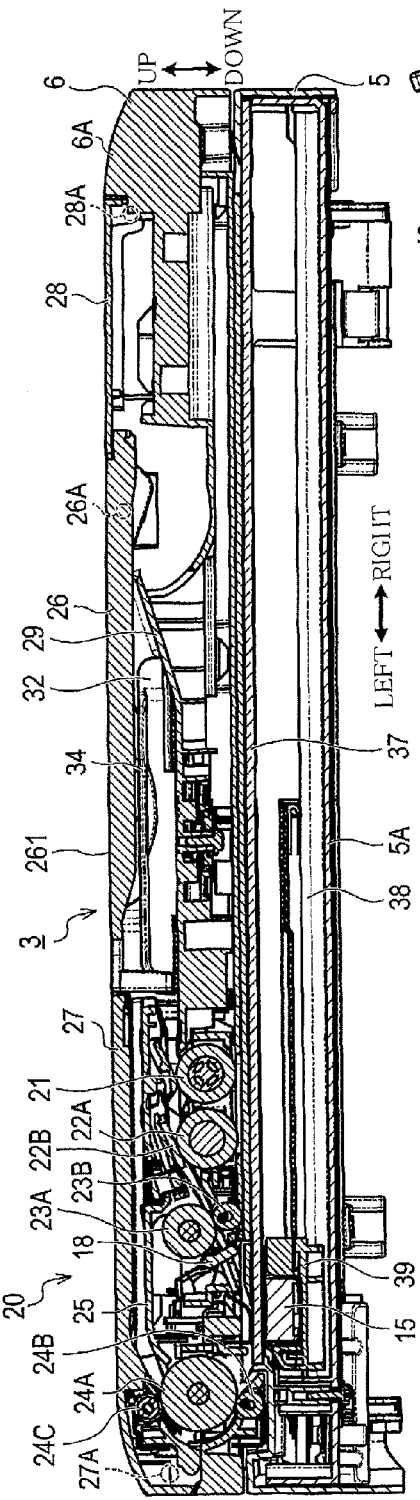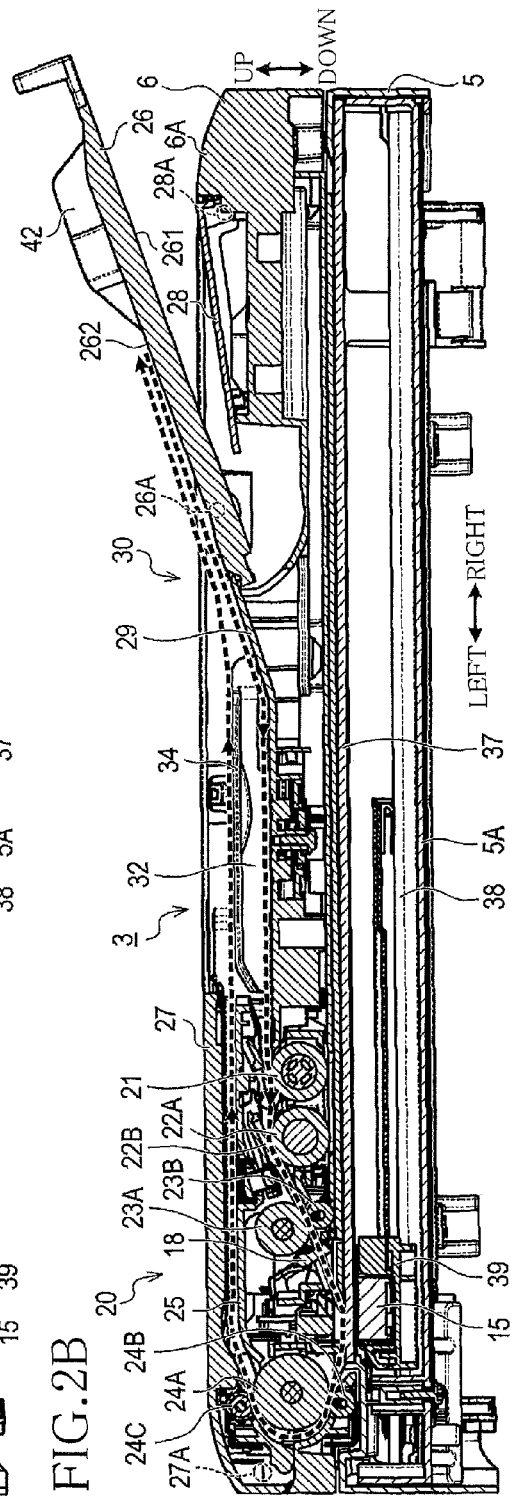

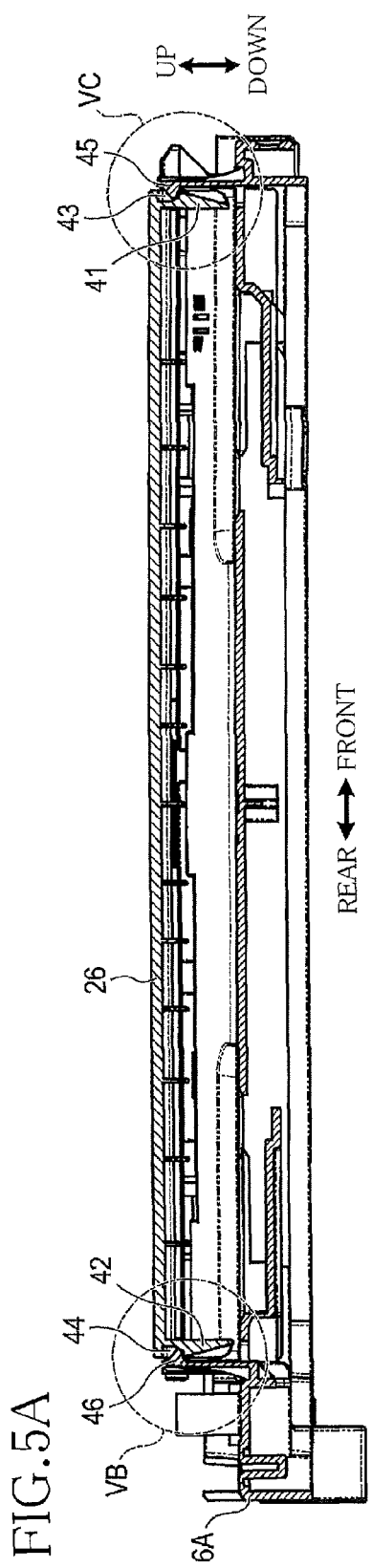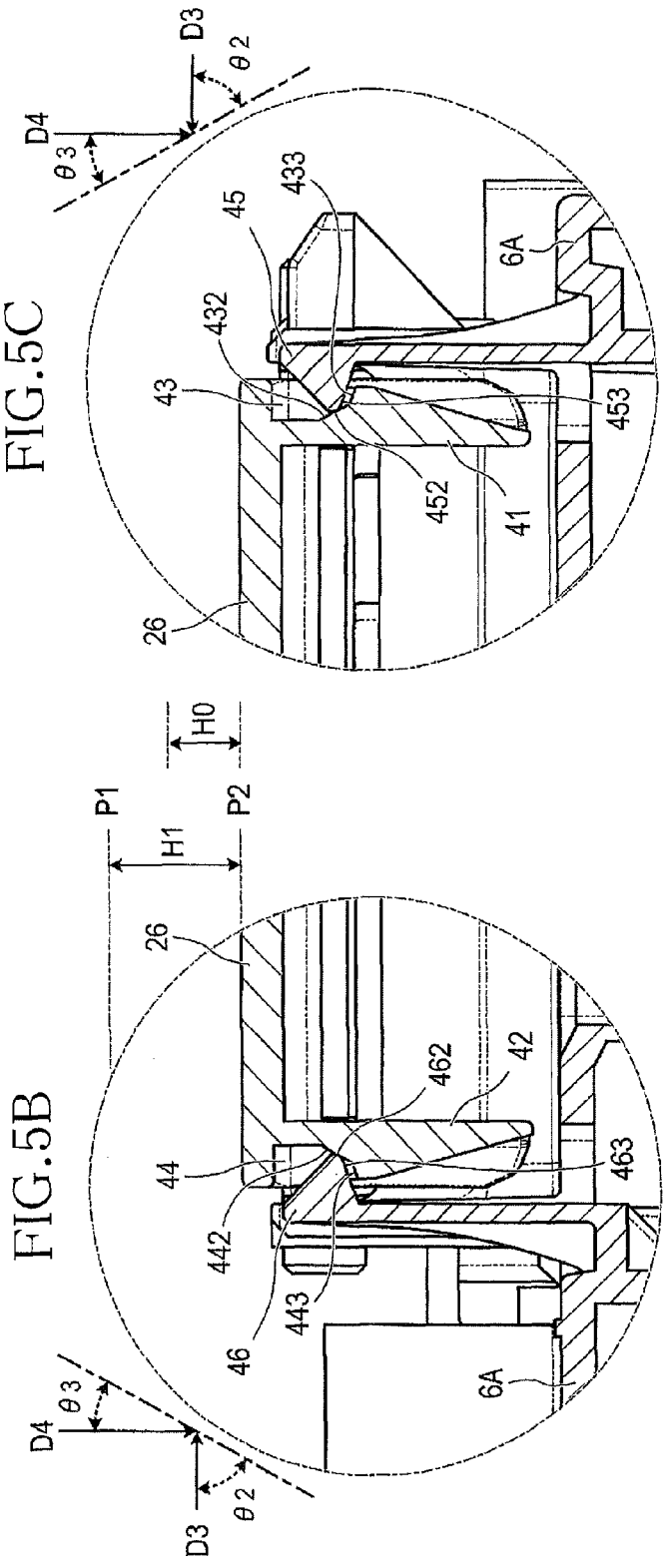

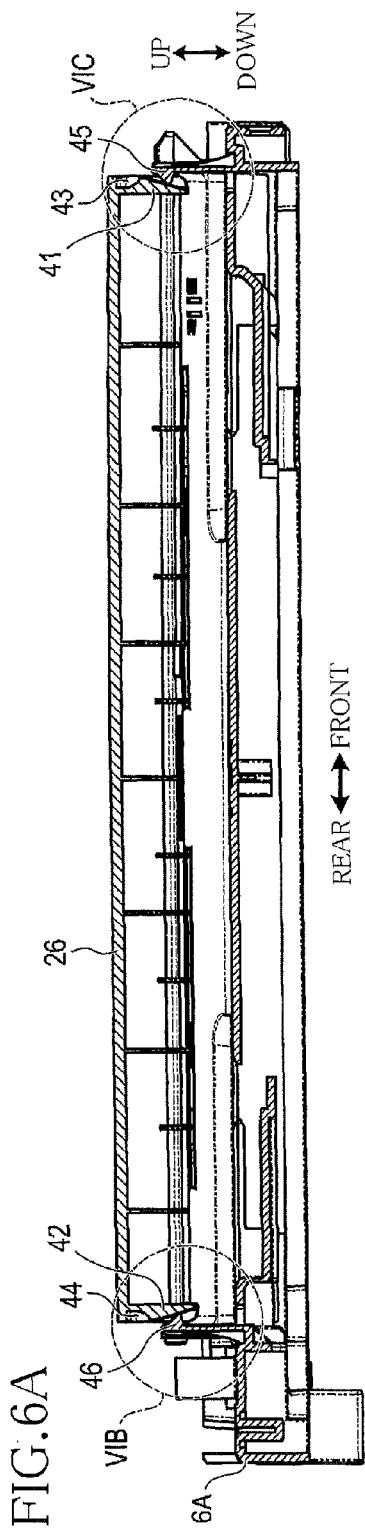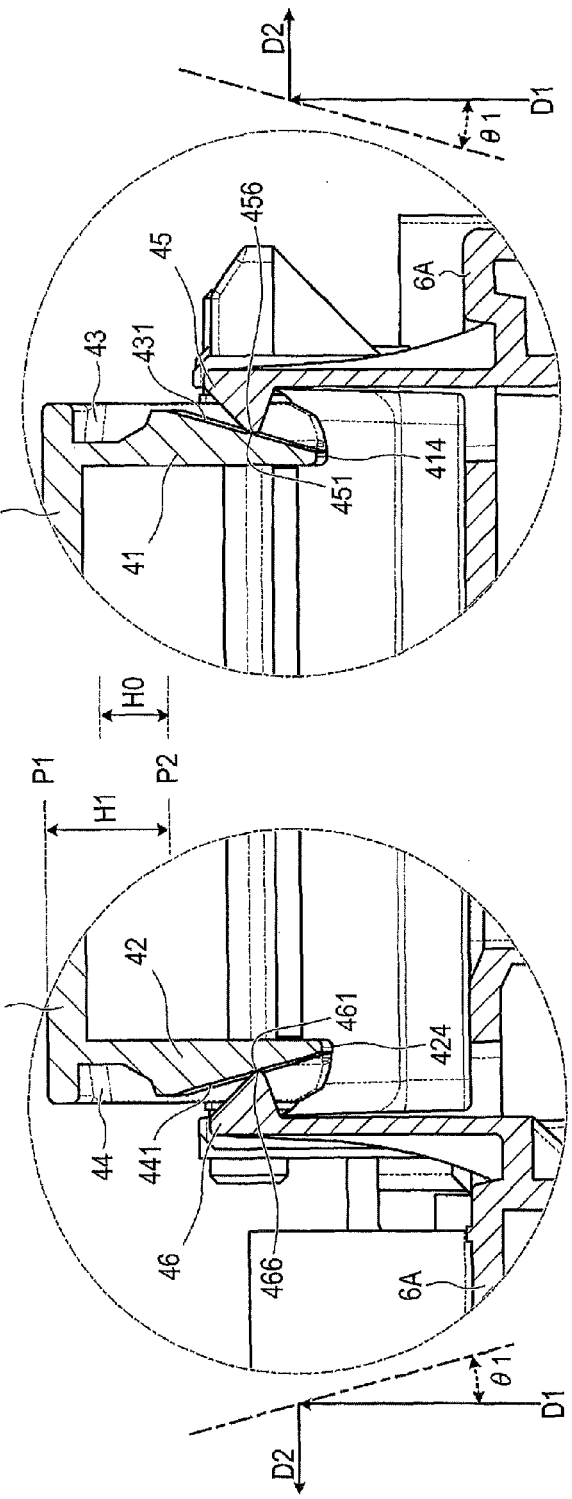

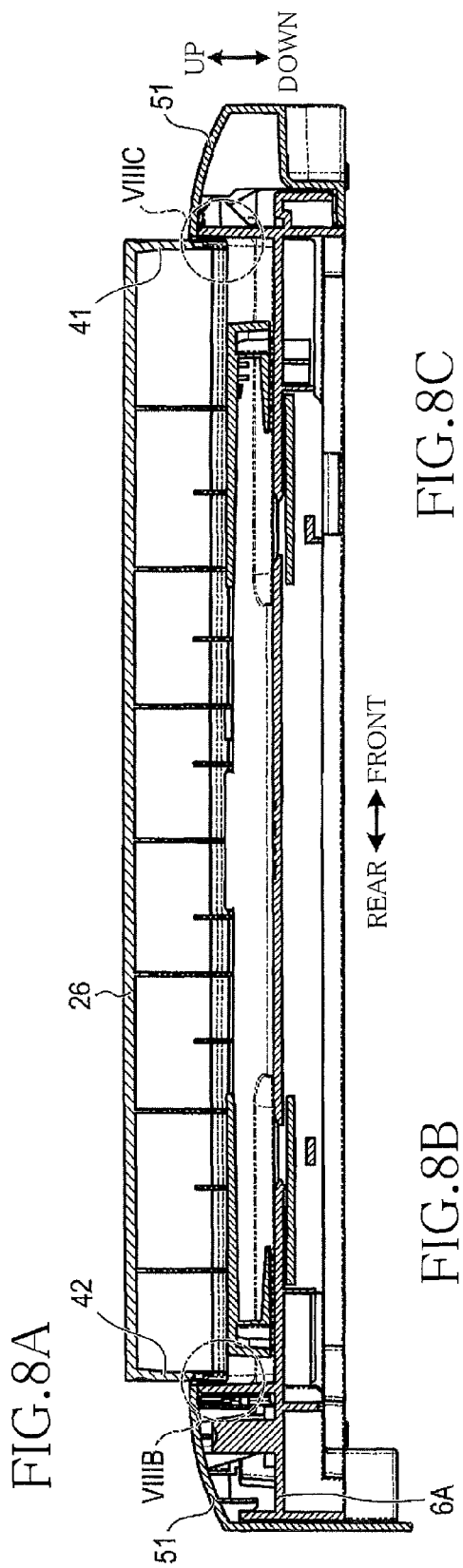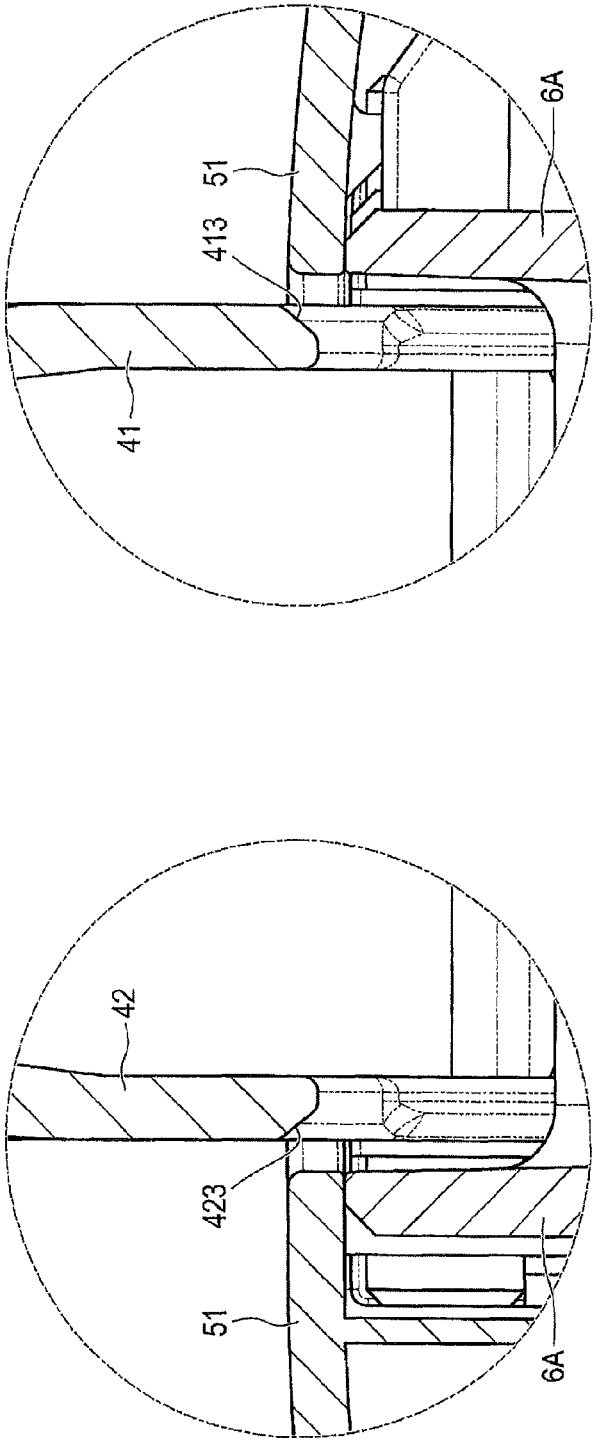

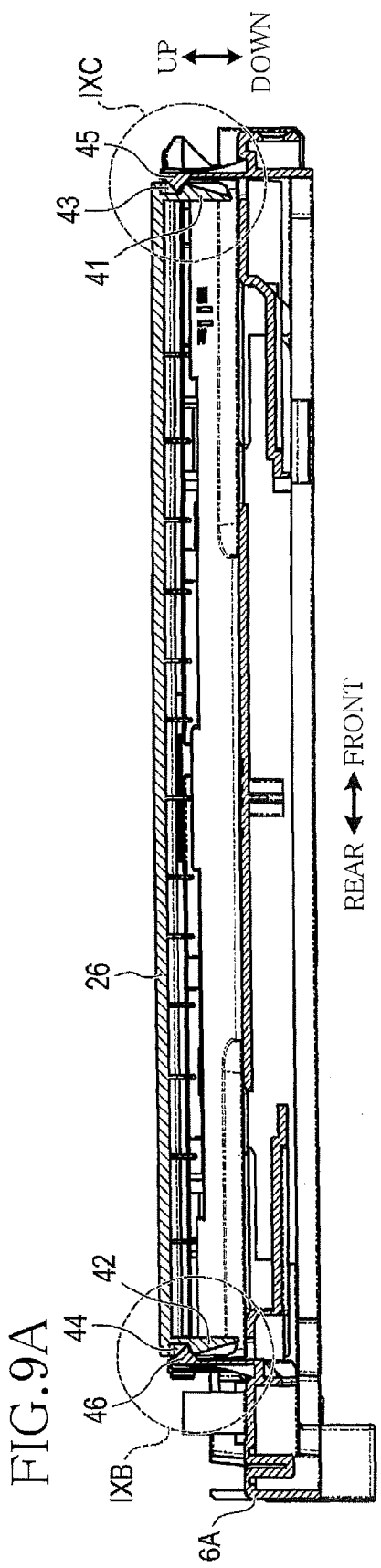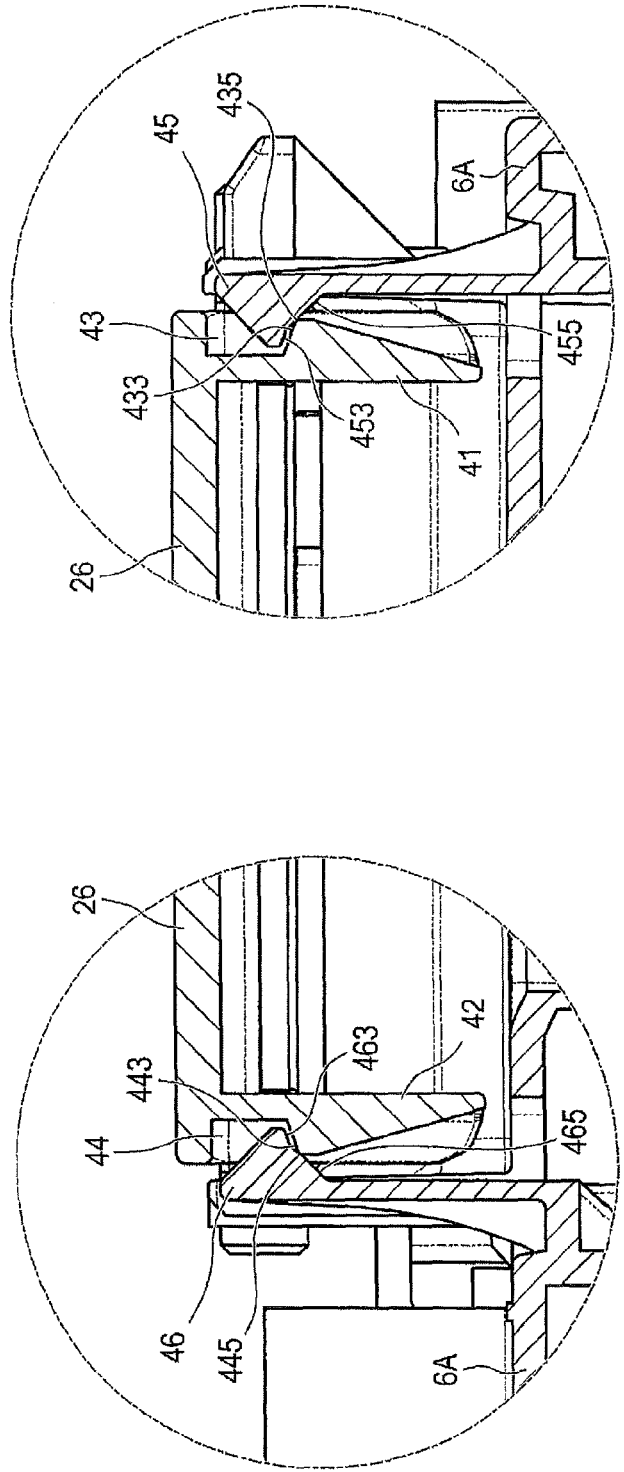

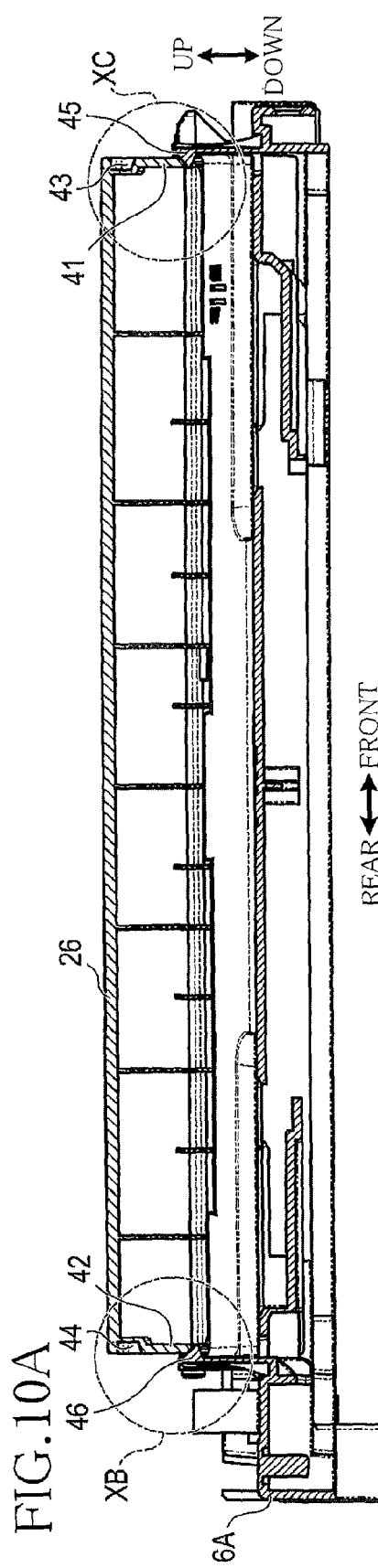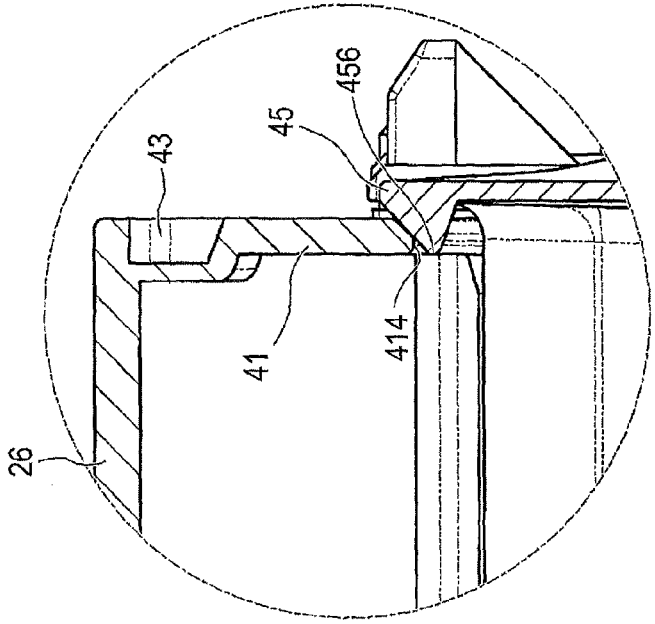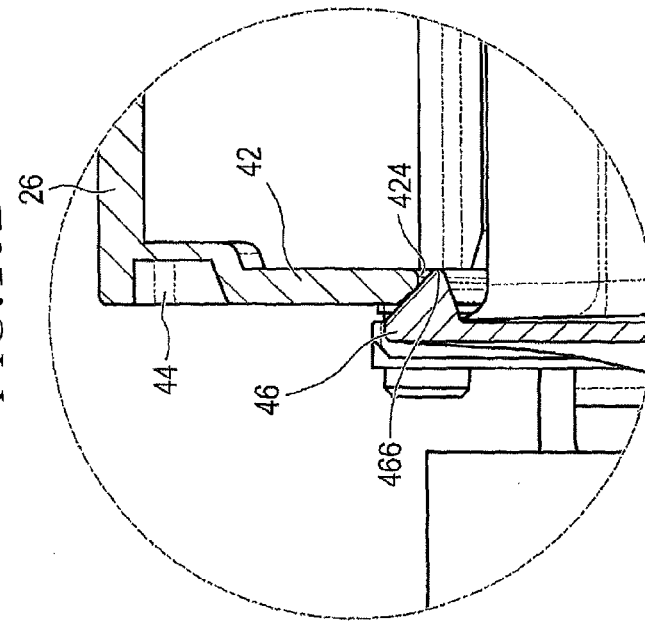

SHEET CONVEYING DEVICE AND IMAGE READING APPARATUS

CROSS REFERENCE TO RELATED APPLICATION

The present application claims priority from Japanese Patent Application No. 2014-164404, which was filed on Aug. 12, 2014, the disclosure of which is herein incorporated by reference in its entirety.

BACKGROUND

1. Technical Field

The following disclosure relates to a sheet conveying device and an image reading apparatus.

2. Description of the Related Art

There is known an image reading apparatus equipped with an automatic document feeder (ADF), as the sheet conveying device, having a movable member. When located at a first position, the movable member functions as an upper cover that partially constitutes an exterior of the device. When located at a second position, the movable member functions as a sheet-supply tray for supporting a sheet that is conveyed.

The known ADF cooperates with a printer body to constitute a multifunction printer. The printer body includes a scanner unit and a recording unit. The scanner unit cooperates with the ADF to perform image reading and is available as a flatbed scanner. The recording unit forms an image on a recording medium.

SUMMARY

The movable member described above is movable between the two positions. When the scanner unit operates as the flatbed scanner or when the recording unit operates to perform image formation in a state in which the movable member is utilized as the upper cover, the movable member may receive vibration transmitted thereto from the scanner or the recording unit, and the movable member accordingly may wobble. Further, when the device is carried or moved in a state in which the movable member functions as the upper cover, there is a possibility that the movable member wobbles.

In view of the situations described above, it is desirable to provide a technique of reducing wobbling of a supporter, as the movable member, provided in a device, the supporter being configured to support a sheet to be supplied or to be output and to function also as an upper cover of the device.

In one aspect of the disclosure, a sheet conveying device includes: a base; a conveyor disposed in the base and configured to convey a sheet along a conveyance path; a supporter configured to be moved relative to the base so as to be movable between a first position and a second position, the supporter having a first surface and a second surface which is opposite to the first surface and on which a plurality of ribs are formed so as to protrude therefrom, the supporter being configured such that, when the supporter is located at the first position, the first surface partially defines an exterior surface of the sheet conveying device and such that, when the supporter is located at the second position, the sheet to be supplied to or output from the conveyor is supportable on the second surface; a pair of regulators one of which is provided at one of opposite ends of the supporter in a widthwise direction orthogonal to a conveying direction of the sheet and the other of which is provided at the other of the opposite ends of the supporter in the widthwise direction, the regulators protruding in a direction of protrusion of the ribs by an amount larger than an amount by which the ribs protrude, the regulators being configured to regulate a position, in the widthwise direction, of the sheet supported by the supporter; a pair of engaged portions each constituted by one of a recess and a hole formed in a corresponding one of the regulators; and a pair of engaging portions protruding from the base so as to correspond to the pair of engaged portions, the engaging portions being configured to engage with the engaged portions when the supporter is located at the first position and to disengage from the engaged portions when the supporter is located at a position that is shifted from the first position toward the second position.

In another aspect of the disclosure, an image reading apparatus includes a sheet conveying device configured to convey, along a conveyance path, a sheet whose image is to be read, wherein sheet conveying device includes: a base; a conveyor disposed in the base and configured to convey a sheet along the conveyance path; a supporter configured to be moved relative to the base so as to be movable between a first position and a second position, the supporter having a first surface and a second surface which is opposite to the first surface and on which a plurality of ribs are formed so as to protrude therefrom, the supporter being configured such that, when the supporter is located at the first position, the first surface partially defines an exterior surface of the sheet conveying device and such that, when the supporter is located at the second position, the sheet to be supplied to or output from the conveyor is supportable on the second surface; a pair of regulators one of which is provided at one of opposite ends of the supporter in a widthwise direction orthogonal to a conveying direction of the sheet and the other of which is provided at the other of the opposite ends of the supporter in the widthwise direction, the regulators protruding in a direction of protrusion of the ribs by an amount larger than an amount by which the ribs protrude, the regulators being configured to regulate a position, in the widthwise direction, of the sheet supported by the supporter; a pair of engaged portions each constituted by one of a recess and a hole formed in a corresponding one of the regulators; and a pair of engaging portions protruding from the base so as to correspond to the pair of engaged portions, the engaging portions being configured to engage with the engaged portions when the supporter is located at the first position and to disengage from the engaged portions when the supporter is located at a position that is shifted from the first position toward the second position.

In still another aspect of the disclosure, an image reading apparatus includes a sheet conveying device configured to convey, along a conveyance path, a sheet whose image is to be read, wherein sheet conveying device includes: a base; a conveyor disposed in the base and configured to convey a sheet along a conveyance path; a supporter configured to be moved relative to the base so as to be movable between a first position and a second position, the supporter having a first surface and a second surface which is opposite to the first surface, the supporter being configured such that, when the supporter is located at the first position, the first surface partially defines an outer surface of the sheet conveying device and such that, when the supporter is located at the second position, the sheet to be supplied to or output from the conveyor is supportable on the second surface; a pair of regulators one of which is provided so as to protrude from one of opposite ends of the supporter in a widthwise direction orthogonal to a conveying direction of the sheet and the other of which is provided so as to protrude from the other of the opposite ends of the supporter in the widthwise direction, the regulators being configured to regulate a position, in the widthwise direction, of the sheet supported by the supporter;

a pair of engaged portions each constituted by one of a recess and a hole formed in a corresponding one of the regulators; and a pair of engaging portions protruding from the base so as to correspond to the pair of engaged portions, the engaging portions being configured to engage with the engaged portions when the supporter is located at the first position and to disengage from the engaged portions when the supporter is located at a position that is shifted from the first position toward the second position, wherein, when the supporter is moved from the second position to the first position, the regulators come into contact with the engaging portions so as to elastically deform the engaging portions, and an amount of elastic deformation of the engaging portions is reduced when the engaged portions reach the engaging portions, so that the engaging portions and the engaged portions engage with one another, wherein the amount by which the regulators protrude is determined such that the supporter is moved together with the regulators by a distance in a period from a time point when the regulators come into contact with the engaging portions to a time point when the supporter reaches the first position, the distance being not smaller than a predetermined distance, and wherein the predetermined distance is determined such that, in an instance where one of the regulators is movable while elastically deforming one of the engaging portions corresponding to the one of the regulators whereas the other of the regulators is hindered from moving due to contact with the other of the engaging portions corresponding to the other of the regulators, during a movement of the supporter from the second position to the first position, a further movement of the supporter toward the first position causes an increase in a force that is applied from the other of the regulators to the other of the engaging portions by elastic deformation of the supporter, so that the other of the regulators becomes movable while elastically deforming the other of the engaging portions before the one of the regulators moves beyond the predetermined distance.

BRIEF DESCRIPTION OF THE DRAWINGS

The objects, features, advantages, and technical and industrial significance of the present disclosure will be better understood by reading the following detailed description of embodiments, when considered in connection with the accompanying drawings, in which:

FIG. 2A is a central cross-sectional view showing a reading unit whose central cover is located at a closed position and FIG. 2B is a central cross-sectional view showing the reading unit whose central cover is located at an open position;

FIG. 5A is a vertical cross-sectional view showing engaging portions and the regulators in the state in which the supporter is located at the first position, FIG. 5B is an enlarged view of a portion VB in FIG. 5A, and FIG. 5C is an enlarged view of a portion VC in FIG. 5A;

FIG. 6A is a vertical cross-sectional view showing the engaging portions and the regulators at a time point when the engaging portions and the regulators come into contact with one another during a movement of the supporter from the second position to the first position, FIG. 6B is an enlarged view of a portion VIB in FIG. 6A, and FIG. 6C is an enlarged view of a portion VIC in FIG. 6A;

FIG. 8A is a vertical cross-sectional view showing the state in which the regulators reach respective positions at which the regulators are contactable with the frame during the movement of the supporter from the second position to the first position, FIG. 8B is an enlarged view of a portion VIIIB in FIG. 8A, and FIG. 8C is an enlarged view of a portion VIIIC in FIG. 8A;

FIG. 9A is a vertical cross-sectional view showing engaging portions and regulators in a state in which the supporter is located at the first position, the engaging portions and the regulators being different in shape from those shown in FIGS. 6A-6C, FIG. 9B is an enlarged view showing a portion IXB in FIG. 9A, and FIG. 9C is an enlarged view showing a portion IXC in FIG. 9A; and FIG. 10A is a vertical cross-sectional view showing engaging portions and regulators at a time point when the engaging portions and the regulators come into contact with one another during the movement of the supporter from the second position to the first position, the engaging portions and the regulators being different in shape from those in FIGS. 5A-5C, FIG. 10B is an enlarged view of a portion XB in FIG. 10A, and FIG. 10C is an enlarged view of a portion XC in FIG. 10A.

DETAILED DESCRIPTION OF THE EMBODIMENTS

There will be hereinafter explained a sheet conveying device according to one embodiment.

Configuration of MFP

Figure 1:
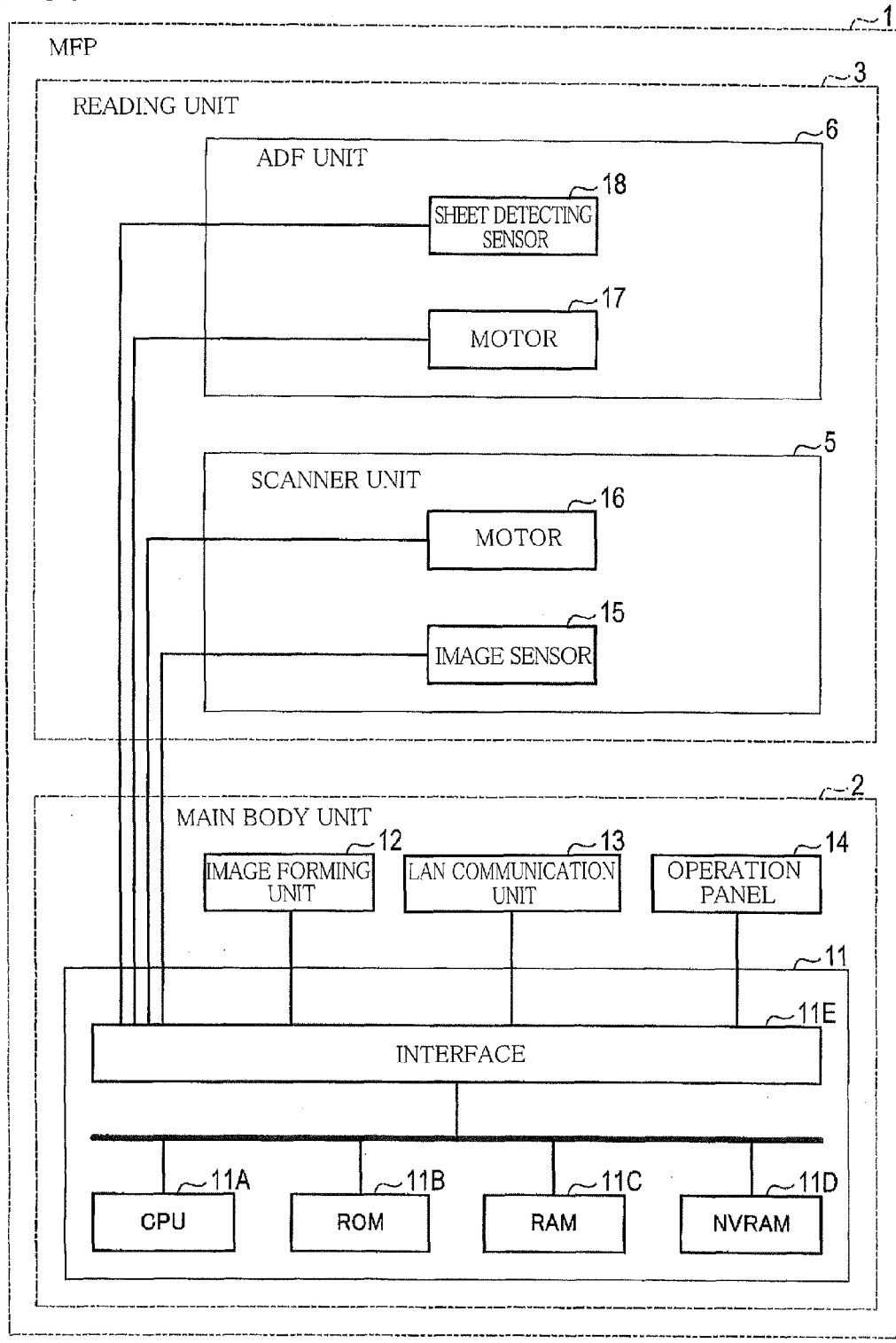
FIG. 1 is a block diagram showing a configuration of a multifunction peripheral (MFP)

A multi-function peripheral (MFP) 1 shown in FIG. 1 has a configuration corresponding to the sheet conveying device and the image reading apparatus described above. For easy understanding of a relative positional relationship of components of the MFP 1, directions such as an up-down direction, a front-rear direction, and a right-left direction are indicated in the drawings (FIGS. 2-10), and the following explanation will be made referring to the directions. In the following explanation, the up-down direction is a direction orthogonal to the horizontal plane in a case where the MFP 1 is placed on the horizontal plane. A frontward direction is a direction in which an operation panel 14 (described below) is oriented. A rearward direction is a direction opposite to the frontward direction. The right-left direction is a right-left direction in a case where the MFP 1 is viewed from a front side thereof. It is noted that orientations of movable components may be changed and directions indicated in the drawings are not always maintained.

As shown in FIG. 1, the MFP 1 includes a main body unit 2 and a reading unit 3 (as one example of the image reading apparatus). The main body unit 2 has an opening (not shown) formed in its upper surface. The reading unit 3 is attached to an upper portion of the main body unit 2 and is movable between a closed position and an open position. When the reading unit 3 is located at the closed position, the opening of the main body unit 2 is closed by the reading unit 3. When the reading unit 3 is located at the open position, the opening of the main body unit 2 is exposed. Maintenance of components housed in the main body unit 2 can be performed through the opening. The reading unit 3 includes a scanner unit 5 and an ADF unit 6 (as one example of the sheet conveying device). The scanner unit 5 and the ADF unit 6 will be later explained.

As shown in FIG. 1, the main body unit 2 includes a controller 11. The controller 11 includes a CPU 11A, a ROM 11B, a RAM 11C, an NVRAM 11D, an interface 11E, and so on known in the art. The CPU 11A executes processing according to control programs stored in the ROM 11B and the RAM 11C, whereby components and devices of the MFP 1 are controlled.

The components and the devices controlled by the controller 11 include an image forming unit 12, a LAN communication unit 13, an operation panel 14, an image sensor 15, a motor 16, a motor 17, and a sheet detecting sensor 18. The image forming unit 12, the LAN communication unit 13, and the operation panel 14 are provided in the main body unit 2. The image sensor 15 and the motor 16 are provided in the scanner unit 5. The motor 17 and the sheet detecting sensor 18 are provided in the ADF unit 6.

The image forming unit 12 is capable of forming an image on a recording medium such as a cut sheet by an ink jet method. Specifically, the image forming unit 12 includes a conveying mechanism for conveying the recording medium, a recording head for ejecting ink, and a drive mechanism for reciprocating the recording head. These are well known, and explanation and illustration thereof are dispensed with. The image forming unit 12 may be configured to form an image on the recording medium by an electronic-photographic method.

The LAN communication unit 13 includes a communication interface device for a wireless LAN and a communication interface device for wired LAN. The operation panel 14 includes: input devices (e.g., a touch panel, buttons, and switches) which are operated by a user for giving various instructions to the MFP 1; and output devices (e.g., a liquid crystal display and lamps) for notifying the user of an operating state of the MFP 1.

The image sensor 15 is one-dimensional image sensor including a plurality of reading elements arranged in one direction. In the present embodiment, a contact image sensor (CIS) is used as the image sensor 15. The motor 16 is a power source for moving the image sensor 15 in a sub-scanning direction orthogonal to a main scanning direction that coincides with the direction in which the reading elements of the image sensor 15 are arranged. The motor 17 is a power source for conveying the sheet in the ADF unit 6. The sheet detecting sensor 18 detects that a leading edge or a trailing edge of the sheet conveyed in the ADF unit 6 in a sheet conveying direction has passed through a predetermined detecting position.

In the present embodiment, the sheet detecting sensor 18 is a contact sensor configured to be switched between on and off depending on whether or not the sheet being conveyed is contacting the sensor. It is noted that a sensor of another type may be used in place of the contact sensor. For instance, there may be used a non-contact sensor capable of detecting that the leading edge or the trailing edge of the sheet in the sheet conveying direction has passed through the predetermined detecting position. Such a non-contact sensor includes an optical sensor capable of detecting whether or not the sheet being conveyed is intercepting an optical path and an optical sensor capable of detecting whether or not light is reflected by the sheet being conveyed.

Details of Reading Unit

The reading unit 3 will be next explained in detail. As shown in FIGS. 2A and 2B, a conveying unit 20 (as one example of a conveyor) is disposed in the ADF unit 6 of the reading unit 3. The conveying unit 20 is configured to convey the sheet along a predetermined conveyance path indicated by a broken line in FIG. 2B. The conveying unit 20 includes a supply roller 21, a separation roller 22A, a separation piece 22B, a relay roller 23A, a relay pinch roller 23B, an inverting roller 24A, a first inverting pinch roller 24B, and a second inverting pinch roller 24C. A guide 25 extending along the conveyance path is disposed so as to cover the supply roller 21, the separation roller 22A, the separation piece 22B, the relay roller 23A, and the relay pinch roller 23B from an upper side.

The ADF unit 6 includes an ADF base 6A (as one example of a base), a central cover 26 (as one example of a supporter), a left cover 27, and a right cover 28. The ADF base 6A houses the conveying unit 20. The three covers, namely, the central cover 26, the left cover 27, and the right cover 28, constitute an upper cover of the MFP 1 (the reading unit 3). The central cover 26, the left cover 27, and the right cover 28 are pivotally supported by the ADF base 6A through respective support shaft portions 26A, 27A, 28A. One of a shaft and a bearing that constitute the support shaft portion 26A is provided on the central cover 26 while the other is provided on the ADF base 6A as the base of the ADF unit 6 or other member (e.g., the ADF base 6A per se or a member fixed to the ADF base 6A). Similarly, one of a shaft or a bearing that constitute the support shaft portion 27A is provided on the left cover 27 while the other is provided on the ADF base 6A or the like. Further, one of a shaft and a bearing that constitute the support shaft portion 28A is provided on the right cover 28 while the other is provided on the ADF base 6A or the like.

Figure 3A:
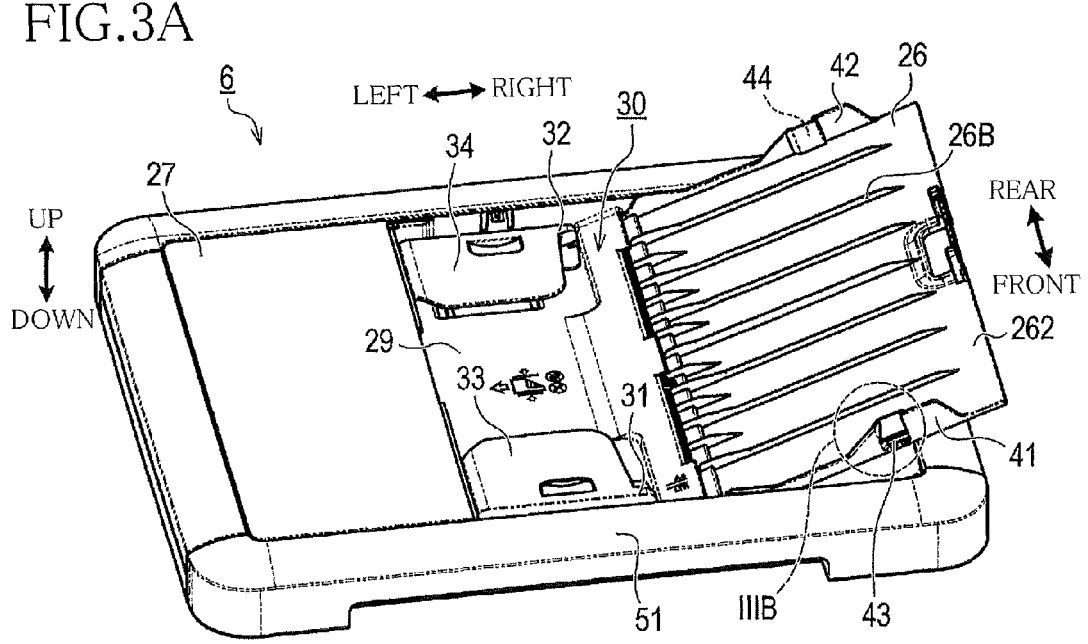
FIG. 3A is a perspective view showing an ADF unit in a state in which the central cover is located at the open position and FIG. 3B is an enlarged view showing a portion IIIB in FIG. 3A.
Figure 3B:
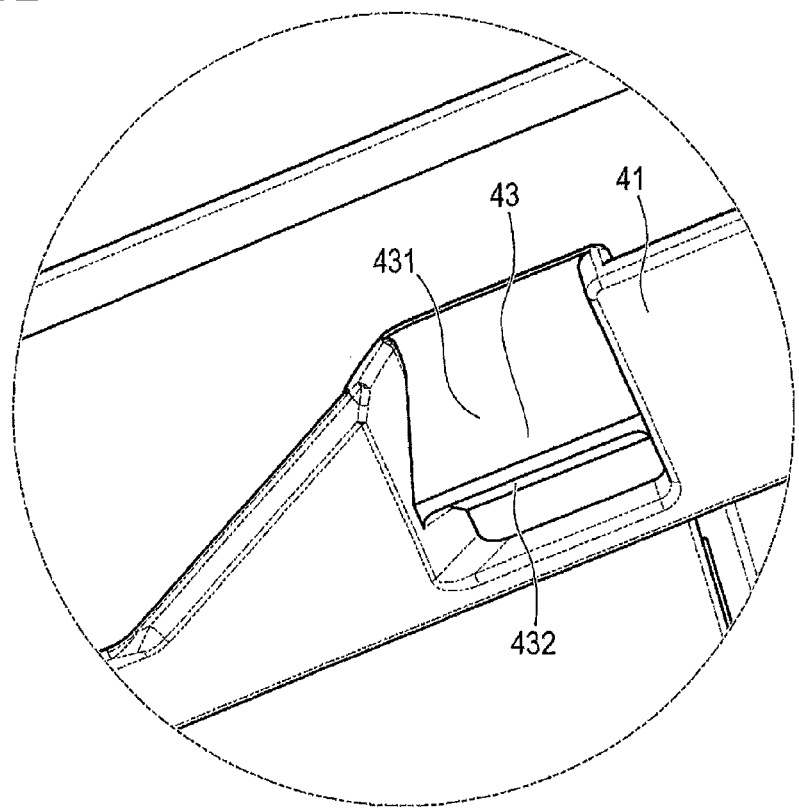

When the central cover 26 is located at a closed position (as one example of a first position) shown in FIG. 2A, a first surface 261 of the central cover 26 partially defines an upper exterior of the ADF unit 6 as the sheet conveying device. When the central cover 26 is located at an open position (as one example of a second position) shown in FIG. 2B, a second surface 262 of the central cover 26 functions as a sub tray on which the sheet or the sheets can be supported. (The central cover 26 will be referred to as "sub tray 26" where appropriate.) As shown in FIG. 3A, a plurality of ribs 26B are formed on the second surface 262 of the sub tray 26 so as to protrude therefrom. When the sub tray 26 supports the sheet on its second surface 262, the ribs 26B reduces an area of contact of the sub tray 26 and the sheet, thereby reducing a frictional force that acts between the sub tray 26 and the sheet. The amount of protrusion, the length, the shape, etc., of the ribs 26B are not limited to particular values as long as the frictional force between the sub tray 26 and the sheet can be reduced.

In a state shown in FIG. 2A, a main tray 29 formed integrally with the ADF base 6A is provided below the central cover 26. When the sub tray 26 is located at the open position, the sub tray 26 and the main tray 29 are disposed to as to be adjacent to each other. At the position where the sub tray 26 and the main tray 29 are adjacent to each other, portions of the sub tray 26 and the main tray 29 that define a boundary therebetween are flush with each other. In this state, the main tray 29 and the sub tray 26 constitute a sheet support portion 30 for supporting the sheet or the sheets to be supplied to or output from the conveying unit 20.

When the right cover 28 is located at a horizontal position shown in FIG. 2A, an upper surface of the right cover 28 partially defines the upper exterior of the device. When the central cover 26 is pivoted from the closed position shown in FIG. 2A to the open position shown in FIG. 2B, the right cover 28 is moved from the horizontal position shown in FIG. 2A to an inclined position shown in FIG. 2B in conjunction with the pivotal movement of the central cover 26. Specifically, the center of gravity of the right cover 28 is located at a position nearer to the central cover 26 than to the support shaft portion 28A, namely, the center of gravity of the right cover 28 is located at a left-side portion of the right cover 28 in FIG. 2A. Thus, a left end portion (in FIG. 2A) of the right cover 28 near the central cover 26 is always biased downward by the own weight of the right cover 28. In a state in which the right cover 28 is located at the horizontal position shown in FIG. 2A, the left end portion of the right cover 28 near the central cover 26 is superposed on a right end portion (in FIG. 2A) of the central cover 26, and the left end portion of the right cover 28 near the central cover 26 is accordingly prevented, by the central cover 26, from moving downward. Consequently, the right cover 28 is kept located at the horizontal position as long as the central cover 26 is located at the closed position.

When the central cover 26 is moved from the closed position to the open position by a user's operation, the right end portion of the central cover 26 near the right cover 28 starts to move downward. At the same time, the right cover 28 starts to pivot by its own weight and moves toward the inclined position shown in FIG. 2B following the central cover 26 while kept in contact with the central cover 26. When the right cover 28 reaches the inclined position, the central cover 26 is separated away from the right cover 28 and reaches the open position. When the right cover 28 is located at the inclined position, the right cover 28 is kept in a state in which the left end portion (in FIG. 2B) is located at a lower position than its right end portion (in FIG. 2B). In the arrangement, it is possible to prevent the central cover 26 and the right cover 28 from interfering with each other when the central cover 26 is moved to the open position. When the central cover 26 is moved from the open position to the closed position, the central cover 26 comes into contact with the right cover 28 from below the right cover 28 at an intermediate position in the movement. During a subsequent movement of the central cover 26 to the closed position, the central cover 26 and the right cover 28 are moved while kept in contact with each other, and the right cover 28 is moved to the horizontal position by a force received from the central cover 26.

In a state in which the left cover 27 is located at its closed position shown in FIG. 2A, an upper surface of the left cover partially defines the upper exterior of the device and covers the conveying unit 20 and the guide 25. In this state, the guide 25 and the left cover 27 define a space therebetween functioning as the conveyance path. When the left cover 27 is pivoted to its open position (not shown), the conveying unit 20 and the guide 25 are exposed. Thus, in an instance where a sheet is jammed in the conveying unit 20, the left cover 27 is pivoted to the open position for removing the jammed sheet.

As shown in FIG. 3A, side guides 31, 32 are provided on the main tray 29. The side guides 31, 32 are configured to slide in a widthwise direction of the sheet, i.e., the front-rear direction in FIG. 3A, such that a distance therebetween in the widthwise direction is changeable. When one of the side guides 31, 32 is slid in one direction, the other of the guides 31, 32 is slid in a direction opposite to the one direction in conjunction with the sliding movement of the one side guide. Thus, the side guides 31, 32 can be slid toward and away from each other.

The side guides 31, 32 are respectively provided with extending portions 33, 34 extending substantially horizontally toward each other from upper ends of the respective side guides 31, 32. When the sheet or the sheets to be supplied to the conveying unit 20 is set on the sheet support portion 30, the sheet or the sheets is set under the extending portions 33, 34. In this state, the side guides 31, 32 are brought into contact with opposite edges of the sheet in the widthwise direction, whereby the position of the sheets on the main tray 29 and the conveying direction of the sheets are defined. It is thus possible to prevent or reduce an occurrence of skew of the sheet conveyed by the conveying unit 20.

Each of the sheets set on the sheet support portion 30 is conveyed along the conveyance path indicated by the broken line in FIG. 2B. The sheets are supplied by the supply roller 21 from the main tray 29 toward its downstream side in the sheet conveying direction and are separated one by one by the separation roller 22A and the separation piece 22B. The separated sheet is conveyed by the relay roller 23A toward its downstream side in the sheet conveying direction. The sheet conveyed by the relay roller 23A comes into contact with the sheet detecting sensor 18, and a leading edge and a tailing edge of the sheet are detected. After having passed through the sheet detecting sensor 18, the sheet is conveyed by the inverting roller 24A in between the guide 25 and the left cover 27 and is then output from the conveying unit 20. The sheet output from the conveying unit 20 is output onto the extending portions 33, 34. Depending on the size of the sheet, a part of the sheet reaches the sheet support portion 30 constituted by the main tray 29 and the sub tray 26 (i.e., the central cover 26). That is, the sheet support portion 30 has a function of supporting the sheet after having been conveyed by and output from the conveying unit 20.

As shown in FIGS. 2A and 2B, the scanner unit 5 includes a platen 37, a guide rail 38, and a carriage 39. The platen 37 is a transparent glass plate functioning as a support surface for supporting an object to be read on an upper surface of the scanner unit 5. The guide rail 38 is formed integrally with an inner bottom surface of a scanner base 5A as a base of the scanner unit 5. The guide rail 38 extends in the right-left direction in FIG. 2B while kept in parallel with the lower surface of the platen 37. The carriage 39 is mounted on the guide rail 38 such that the carriage 39 is supported so as to be reciprocable along the guide rail 38 in the right-left direction. The carriage 39 is coupled to an endless toothed belt (not shown). When the toothed belt is driven and rotated by the motor 16 (FIG. 1), the carriage 39 is reciprocated in the right-left direction following the toothed belt.

The image sensor 15 is mounted on the carriage 39 in a state in which the main scanning direction coincides with the front-rear direction in FIG. 2A (i.e., a direction perpendicular to both of the right-left direction and the up-down direction in FIG. 2A) and the reading elements are directed upward. Thus, when the carriage 39 is reciprocated in the right-left direction, the image sensor 15 is moved in the sub scanning direction, together with the carriage 39. In an instance where the image sensor 15 reads an image of the sheet supported by the platen 37, the image sensor 15 reads the image while moving together with the carriage 39. In an instance where the image sensor 15 reads an image of the sheet conveyed by the conveying unit 20, the sheet passes between the relay roller 23A and the inverting roller 24A while contacting the upper surface of the platen 37. The image sensor 15 stays stationary under the contact position of the sheet and the upper surface of the platen 37 so as to read the image of the sheet through the platen 37.

Details of Regulators, Engaging Portions, and Engaged Portions

As shown in FIG. 3A, the sub tray 26 is provided with a pair of regulators 41, 42. Specifically, the regulator 41 is provided at one of opposite ends of the sub tray 26 in the widthwise direction (i.e., in the front-rear direction in FIG. 3A) while the regulator 42 is provided at the other of the opposite ends of the sub tray 26 in the widthwise direction. The regulators 41, 42 protrude in the same direction as the direction in which the ribs 26B protrude. The regulators 41, 42 protrude by an amount larger than an amount by which the ribs 26B protrude. When the sheet to be supplied to or output from the conveying unit 20 is supported by and on the sub tray 26, the regulators 41, 42 regulate a position of the sheet in the widthwise direction, thereby preventing the sheet from moving, in the widthwise direction, out of the sub tray 26.

The regulator 41 is provided with an engaged portion 43 while the regulator 42 is provided with an engaged portion 44. As illustrated in enlargement in FIGS. 3B and 4A-4C, the engaged portion 43 is provided in a recess that is formed by concaving a part of the regulator 41 rearward in the drawing. In the recess, a first contact surface 431 and a second contact surface 432 are formed. At a portion of the regulator 41 corresponding to the backside of the engaged portion 43, a convex portion 411 is formed for providing the recess described above.

Figure 4A:
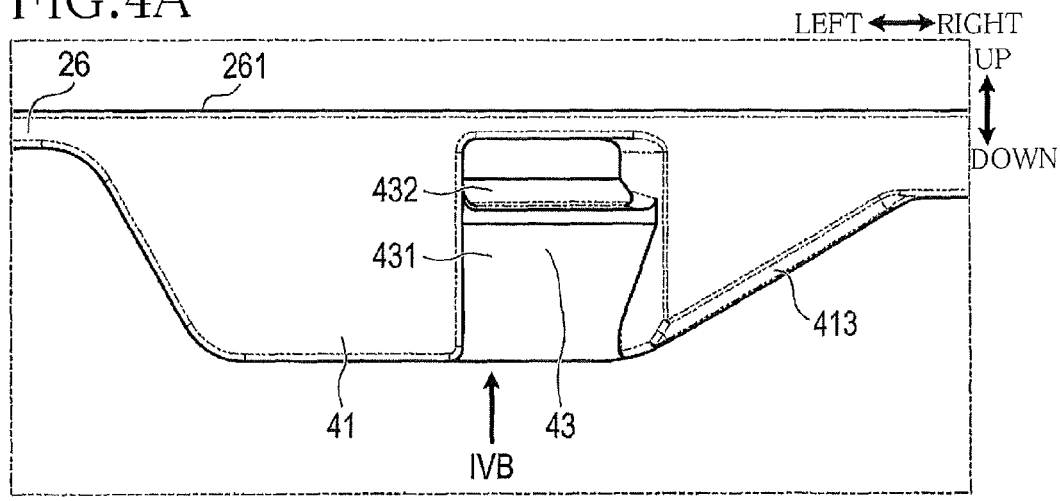
FIG. 4A is a front view of a regulator viewed from a front side of the MFP in a state in which a supporter is located at a first position.
Figure 4B:
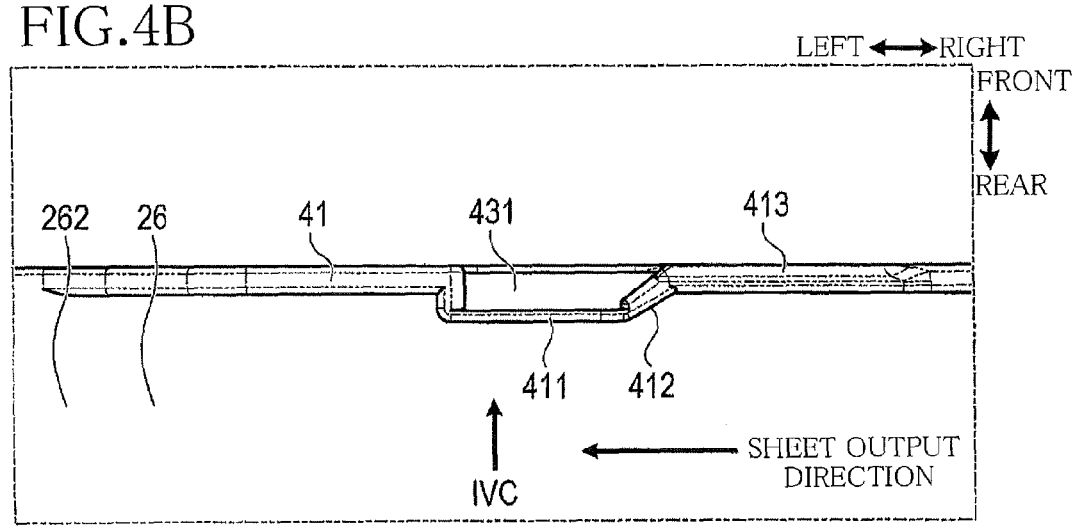
FIG. 4B is a bottom view of the regulator viewed from a direction indicated by an arrow IVB in FIG. 4A.
Figure 4C:
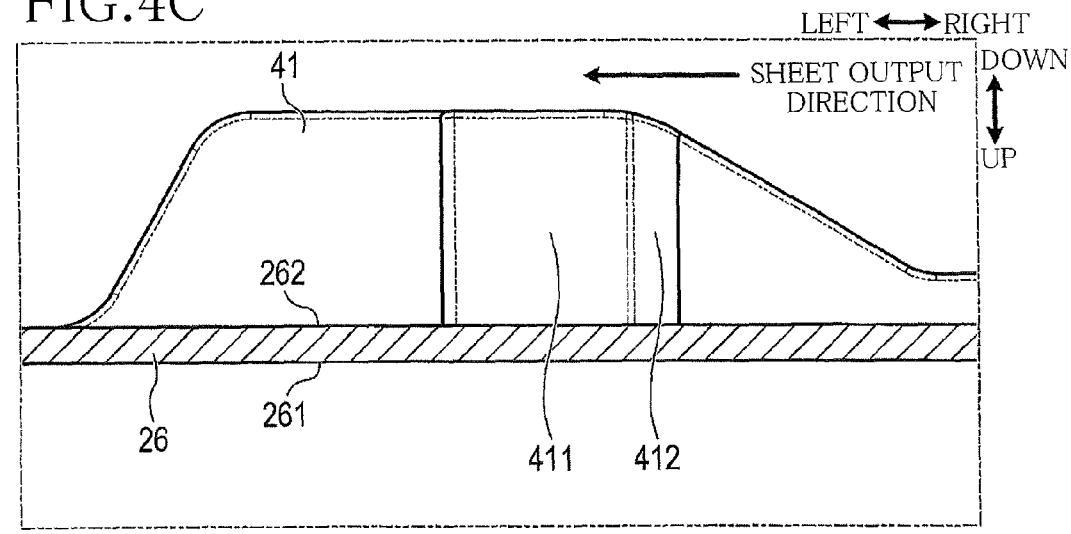
FIG. 4C is a rear view of the regulator viewed from a direction indicated by an arrow IVC in FIG. 4B.

As shown in FIG. 4B, the convex portion 411 includes an inclined surface 412 formed at its upstream end in a direction in which the sheet on the sub tray 26 is output (i.e., sheet output direction). The inclined surface 412 is inclined from the front right toward the rear left in FIG. 4B. The inclined surface 412 prevents the leading edge of the sheet conveyed onto the sub tray 26 after having been output from the conveying unit 20 from getting caught by the convex portion 411 when reaches the convex portion 411.

The regulator 42 and the engaged portion 44 are formed so as to be symmetric with the regulator 41 and the engaged portion 43 about a plane perpendicular to the front-rear direction in FIG. 3A. Thus, the regulator 42 and the engaged portion 44 also have configurations identical to the first contact surface 431, the second contact surface 432, the convex portion 411, and the inclined surface 412. (These configurations provided for the regulator 42 and the engaged portion 44 will be hereinafter referred to as a first contact surface 441, a second contact surface 442, a convex portion 421, and an inclined surface 422).

As shown in FIGS. 5A-5C and FIGS. 6A-6C, engaging portions 45, 46 corresponding to the respective engaged portions 43, 44 are formed on the ADF base 6A so as to protrude therefrom. When the sub tray 26 is located at the closed position (FIGS. 5A-5C), the engaging portions 45, 46 are held in engagement with the corresponding engaged portions 43, 44. When the sub tray 26 is located at a position that is shifted from the closed position toward the open position (as shown in FIGS. 6A-6C, for instance), the engaging portions 45, 46 disengage from the corresponding engaged portions 43, 44.

The engaging portions 45, 46 are elastically deformable. When the sub tray 26 is moved from the open position to the closed position, the regulators 41, 42 come into contact with the engaging portions 45, 46 at a time point when the sub tray 26 reaches a position indicated in FIGS. 6A-6C. When the sub tray 26 is further moved toward the closed position, the engaging portions 45, 46 are elastically deformed by the regulators 41, 42. Thereafter, when the sub tray 26 reaches the closed position and the engaged portions 43, 44 reach the engaging portions 45, 46, an amount of deformation of the elastically deformed engaging portions 45, 46 is reduced, so that the engaging portions 45, 46 and the engaged portions 43, 44 engage with one another as shown in FIGS. 5A-5C.

When the sub tray 26 is moved from the open position to the closed position, first contact portions 451, 461 of the respective engaging portions 45, 46 come into contact with the first contact surfaces 431, 441 of the respective engaged portions 43, 44, as shown in FIGS. 6A-6C. On this occasion, the engaging portions 45, 46 move in a first direction D1 relative to the regulators 41, 42, and the first contact surfaces 431, 441 are inclined at a first inclination angle θ1 with respect to the first direction D1. Therefore, with an increase in the movement of the engaging portions 45, 46 in the first direction D1 relative to the regulators 41, 42 in a state in which the first contact surfaces 431, 441 and the first contact portions 451, 461 are held in contact and slide with one another, a contact pressure of the first contact surfaces 431, 441 and the first contact portions 451, 461 is gradually increased. As a result, the engaging portions 45, 46 are elastically deformed in a second direction D2, and flexure thereof (i.e., the amount of elastic deformation) is gradually increased. Therefore, the sub tray 26 can be moved from the closed position to the open position more smoothly than in a case in which a pressure equal to a maximum contact pressure acts between the regulators 41, 42 and the engaging portions 45, 46 immediately after the first contact surfaces 431, 441 and the first contact portions 451, 461 come into contact with one another.

In the present embodiment, the regulators 41, 42 get in between the engaging portions 45, 46. Thus, the second direction D2 is the frontward direction for the front-side engaging portion 45 while the second direction D2 is the rearward direction for the rear-side engaging portion 46. It is noted, however, that the positional relationship between the regulators 41, 42 and the engaging portions 45, 46 may be modified such that the engaging portions 45, 46 get in between the regulators 41, 42. In such modification, the second direction D2 is the rearward direction for the front-side engaging portion 45 while the second direction D2 is the frontward direction for the rear-side engaging portion 46.

When the engaging portions 45, 46 are held in engagement with the engaged portions 43, 44, second contact portions 452, 462 of the respective engaging portions 45, 46 are held in contact with the second contact surfaces 432, 442 of the respective engaged portions 43, 44 as shown in FIGS. 5A-5C. On this occasion, the elastically deformed engaging portions 45, 46 press the second contact surfaces 432, 442 of the engaged portions 43, 44 in a third direction D3 opposite to the second direction D2, and the second contact surfaces 432, 442 are inclined at a second inclination angle θ2 with respect to the third direction D3. Therefore, a biasing force by which the sub tray 26 is biased toward the closed position is increased with an increase in a pressing force by which the engaging portions 45, 46 press the engaged portions 43, 44 in the third direction D3. As a result, the sub tray 26 can be held in a state in which the sub tray 26 is biased in a direction toward the closed position by the elastic forces of the engaging portions 45, 46, thereby preventing or reducing wobbling of the sub tray 26.

When the sub tray 26 is moved from the closed position to the open position, the engaging portions 45, 46 move in a fourth direction D4 relative to the regulators 41, 42. The fourth direction D4 is opposite to the first direction D1. An inclination angle θ3 of the second contact surfaces 432, 442 with respect to the fourth direction D4 is made larger than the first inclination angle θ1 described above. Therefore, a force by which the sub tray 26 is moved toward the open position when the first contact portions 451, 461 and the first contact surfaces 431, 441 are held in contact with one another is smaller than a force by which the sub tray 26 is moved in the direction toward the closed position when the second contact portions 452, 462 and the second contact surfaces 432, 442 are held in contact with one another. As a result, even though the magnitude of the elastic force generated by the engaging portions 45, 46 is the same, the sub tray 26 can be easily moved toward the closed position when the first contact portions 451, 461 are held in contact with the first contact surfaces 431, 441, and the sub tray 26 can be biased in the direction toward the closed position effectively utilizing the elastic force of the engaging portions 45, 46 when the second contact portions 452, 462 are held in contact with the second contact surfaces 432, 442.

The engaged portions 43, 44 respectively have stopper surfaces 433, 443 while the engaging portions 45, 46 respectively have stopper surfaces 453, 463. The stopper surfaces 433, 443 and the stopper surfaces 453, 463 come into surface contact with one another when the sub tray 26 is moved from the closed position to the open position (FIGS. 5A-5C). In an instance where the sub tray 26 is lifted up by a strong force or the sub tray 26 floats due to warpage of the ADF unit 6, the stopper surfaces 433, 453 are brought into surface contact with each other and the stopper surfaces 443, 463 are brought into surface contact with each other, whereby the sub tray 26 is strongly held at the closed position.

The amount by which the regulators 41, 42 protrude is determined such that the sub tray 26 is moved together with the regulators 41, 42 by a distance in a period from a time point when the regulators 41, 42 come into contact with the engaging portions 45, 46 (FIGS. 6A-6C) to a time point when the sub tray 26 reaches the closed position (FIGS. 5A-5C), the distance being not smaller than a predetermined distance. In the example shown in FIGS. 5A-5C and FIGS. 6A-6C, the amount of protrusion of the regulators 41, 42 is equal to a distance by which the sub tray 26 is moved from a position P1 to a position P2 (a movement distance H1=P2−P1). The amount of protrusion of the regulators 41, 42 are determined such that the movement distance H1 is equal to or larger than a predetermined distance H0 as a reference distance.

The predetermined distance H0 is determined such that, in an instance where one of the regulators 41, 42 (i.e., the one regulator 41) is movable while elastically deforming the corresponding engaging portion 45 whereas the other of the regulators 41, 42 (i.e., the other regulator 42) is hindered from moving due to contact with the corresponding engaging portion 46, during the movement of the sub tray 26 from the open position to the closed position, a further movement of the sub tray 26 toward the closed position causes an increase in a force that is applied from the other regulator 42 to the engaging portion 46 by elastic deformation of the sub tray 26, so that the other regulator 42 becomes movable together with the sub tray 26 toward the closed position while elastically deforming the engaging portion 46 before the one regulator 41 moves by the movement distance H1 that is not smaller than the predetermined distance H0.

In other words, when the amount of protrusion of the regulators 41, 42 is excessively small, the movement distance H1 can be smaller than the predetermined distance H0. In such a case, when the user operates or grabs only one side portion of the sub tray 26 near the one regulator 41 for moving the sub tray 26 to the closed position, there may be a possibility that the one regulator 41 reaches the closed position shown in FIG. 5C whereas the other regulator 42 contacts the engaging portion 46 and gets caught at a position shown in FIG. 6B. In this state, the widthwise opposite end positions of the sub tray 26 are shifted from each other by the movement distance H1. This shift is allowed by elastic deformation of an intermediate portion of the sub tray 26 located between the widthwise opposite end positions. In such a state, however, there occurs a situation in which the engaged portion 43 and the engaging portion 45 that correspond to the one regulator 41 are held in engagement with each other whereas the engaged portion 44 and the engaging portion 46 that correspond to the other regulator 42 are not held in engagement with each other, namely, there occurs the so-called single-side locking.

The single-side locking is resolved by setting the amount of protrusion of the regulators 41, 42 such that the movement distance H1 is sufficiently large. That is, in an instance where the movement distance H1 is sufficiently large, the intermediate portion of the sub tray 26 located between the widthwise opposite end positions is elastically deformed by a large amount before the above-indicated shift corresponding to the movement distance H1 is generated at the widthwise opposite end positions of the sub tray 26. Consequently, the other regulator 42 is strongly pushed onto the engaging portion 46, whereby the engaging portion 46 is elastically deformed. As a result, the engaged portion 44 corresponding to the other regulator 42 reaches a position at which the engaged portion 44 engages with the engaging portion 46, whereby an occurrence of the above-indicated single-side locking is obviated.

In other words, the above-indicated predetermined distance H0 is a minimum value of the movement distance H1 that prevents an occurrence of the single-side locking. Therefore, the single-side locking can be prevented by setting the amount of protrusion of the regulators 41, 42 such that the movement distance H1 is equal to or larger than the minimum value.

Figure 7A:
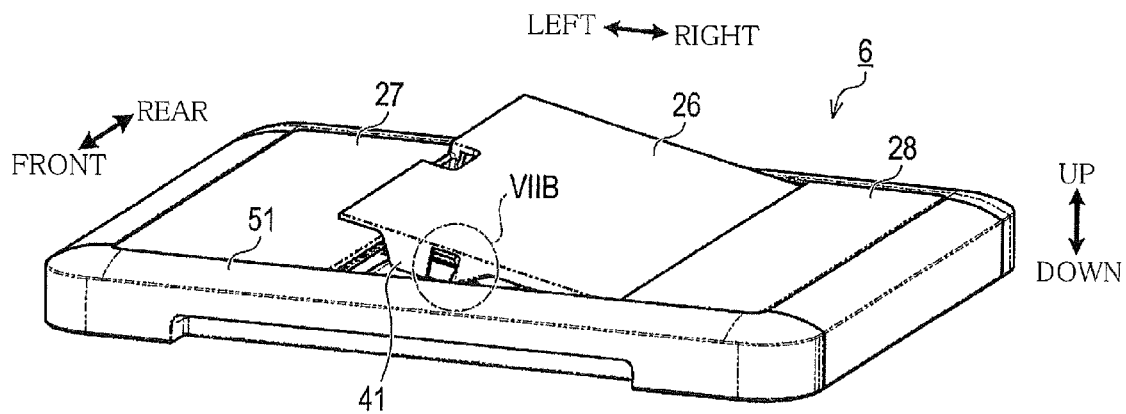
FIG. 7A is a perspective view showing a state in which the regulators reach respective positions at which the regulators are contactable with a frame during the movement of the supporter from the second position to the first position and FIG. 7B is an enlarged view of a portion VIIB in FIG. 7A.
Figure 7B:
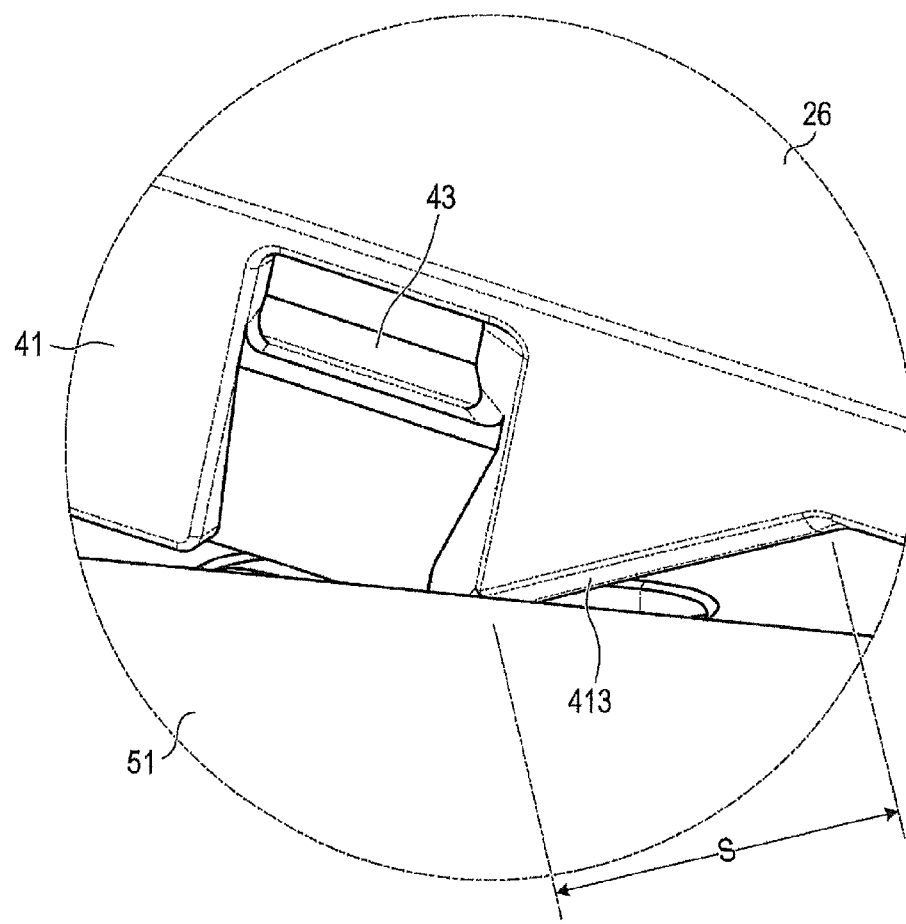

As shown in FIG. 7A, an ADF top cover 51 (as one example of an exterior member) is disposed outside opposite ends, in the widthwise direction, of the sub tray 26 that is located at the closed position, namely, the ADF top cover 51 is disposed outside opposite ends of the sub tray 26 in the front-rear direction in FIG. 7A. When the sub tray 26 is moved to the closed position, the sub tray 26 fits inside the ADF top cover 51. The sub tray 26 is designed so as to fit inside the ADF top cover 51. When the sub tray 26 is moved within tolerance, there is a possibility that any of the regulators 41, 42 slightly gets caught by the ADF top cover 51.

In view of the above, contact surfaces 413, 423 that are inclined with respect to the movement direction of the regulators 41, 42 are formed as shown in FIGS. 8A-8C. Specifically, each contact surface 413, 423 is formed in a range S (FIG. 7B) of an outer edge of the corresponding regulator 41, 42 within which the ADF top cover 51 first comes into contact with the regulator 41, 42 when the sub tray 26 is moved from the open position to the closed position. The contact surfaces 413, 423 incline at an inclination angle determined such that, in an instance where the contact surfaces 413, 423 and the ADF top cover 51 contact with each other when the sub tray 26 is moved from the open position to the closed position, the regulators 41, 42 are guided inside the ADF top cover 51 while the contact surfaces 413, 423 and the ADF top cover 51 slide with each other. Even if the regulators 41, 42 and the ADF top cover 51 are designed so as to be adjacent to each other to such an extent that the regulators 41, 42 and the ADF top cover 51 can contact with each other, the regulators 41, 42 do not hinder the movement of the sub tray 26, and the sub tray 26 can be moved smoothly.

According to the thus constructed MFP 1, the engaging portions 45, 46 and the engaged portions 43, 44 are held in engagement with one another, so that the sub tray 26 can be held at the closed position and the sub tray 26 is prevented from being moved toward the open position. As compared with an arrangement in which such engaging portions 45, 46 and engaged portions 43, 44 are not provided, the present embodiment prevents or reduces an occurrence of wobbling when the device is being operated or when the device is carried or moved.

The engaged portions 43, 44 are provided so as to correspond to the regulators 41, 42 that are provided at the respective opposite ends, in the widthwise direction, of the sub tray 26. Further, the engaging portions 45, 46 are provided so as to correspond to the engaged portions 43, 44. Consequently, when the engaging portions 45, 46 and the engaged portions 43, 44 are brought into engagement with one another, the sub tray 26 is held at the closed position at its widthwise opposite ends. As compared with an arrangement in which the sub tray 26 is held at only one end, in the widthwise direction, of the sub tray 26, the present embodiment ensures a higher effect of preventing or reducing an occurrence of wobbling of the sub tray 26.

In the present embodiment, the engaged portions 43, 44 are respectively provided in the regulators 41, 42. It is thus possible in the present embodiment to reduce areas respectively occupied by those portions in the device, as compared with an arrangement in which the engaged portions 43, 44 are provided separately from the regulators 41, 42. As a result, the device can be accordingly made compact in size.

In addition, the regulators 41, 42 constructed as described above can regulate the position of the sheet in the widthwise direction when the sub tray 26 is located at the open position, so that the sheet to be supplied to or output from the conveying unit 20 is prevented from coming off from the second surface 262 of the sub tray 26.

Other Embodiments

While the embodiment has been described above, it is to be understood that the invention is not limited to the details of the illustrated embodiment, but may be embodied with various other changes without departing from the spirit and the scope of the invention.

In the illustrated embodiment, the inclined second contact surfaces 432, 442 are formed on the engaged portions 43, 44 while the second contact portions 452, 462 are formed on the engaging portions 45, 46. It is optional on which one of the engaged portion and the engaging portion the inclined contact surface is formed. For instance, as shown in FIGS. 9A-9C, inclined second contact surfaces 455, 465 may be formed on the engaging portions 45, 46 while second contact portions 435, 445 may be formed on the engaged portions 43, 44. Also in this instance, owing to the elastic force applied from the engaging portions 45, 46, there acts, on the second contact portions 435, 445, a force by which the sub tray 26 is biased in the direction toward the closed position. Consequently, the similar advantages described above with respect to the illustrated embodiment are expected in this arrangement shown in FIGS. 9A-9C.

In the illustrated embodiment, at a time point when the regulators 41, 42 reach respective positions shown in FIGS. 6A-6C and accordingly come into contact with the respective engaging portions 45, 46 during the movement of the sub tray 26 from the open position to the closed position, lower ends 414, 424 of the regulators 41, 42 are located at a lower level than tips 456, 466 of the engaging portions 45, 46. This configuration is not essential. For instance, as shown in FIGS. 10A-10C, the lower ends 414, 424 of the regulators 41, 42 may be located at a higher level than the tips 456, 466 of the engaging portions 45, 46 at a time point when the regulators 41, 42 come into contact with the engaging portions 45, 46.

In the illustrated embodiment, the ADF unit 6 of the MFP 1 is illustrated as one example of the sheet conveying device. The sheet conveying device need not be a part of the MFP. For instance, the above-described configuration may be used in an image reading apparatus, a copying machine, or a facsimile machine, each having a single function.

In the illustrated embodiment, the configuration of the present sheet conveying device is used in the ADF of the image reading apparatus. It is noted that the configuration of the present sheet conveying device may be used in an image forming apparatus.

Forms that can be Provided Based on Illustrated Embodiment

It can be understood that the sheet conveying device and the image reading apparatus explained above (hereinafter collectively referred to as "sheet conveying device, etc.,") may have the following configurations based on the illustrated embodiment.

In the sheet conveying device, etc., when the supporter is moved from the second position to the first position, the regulators come into contact with the engaging portions so as to elastically deform the engaging portions, and an amount of elastic deformation of the engaging portions is reduced when the engaged portions reach the engaging portions, so that the engaging portions and the engaged portions engage with one another.

In the sheet conveying device, etc., the amount by which the regulators protrude is determined such that the supporter is moved together with the regulators by a distance in a period from a time point when the regulators come into contact with the engaging portions to a time point when the supporter reaches the first position, the distance being not smaller than a predetermined distance. Further, the predetermined distance is determined such that, in an instance where one of the regulators is movable while elastically deforming one of the engaging portions corresponding to the one of the regulators whereas the other of the regulators is hindered from moving due to contact with the other of the engaging portions corresponding to the other of the regulators, during a movement of the supporter from the second position to the first position, a further movement of the supporter toward the first position causes an increase in a force that is applied from the other of the regulators to the other of the engaging portions by elastic deformation of the supporter, so that the other of the regulators becomes movable while elastically deforming the other of the engaging portions before the one of the regulators moves beyond the predetermined distance.

According to the sheet conveying device, etc., constructed as described above, even in a state in which the other of the regulators is hindered from moving due to contact with the other of the engaging portions, it is possible to move the one of the regulators beyond the predetermined distance while elastically deforming the supporter. Consequently, a force that is applied from the other of the regulators to the other of the engaging portions is increased, so that the other of the regulators becomes movable while elastically deforming the other of the engaging portions.

Therefore, unlike an arrangement in which the supporter cannot be largely moved even if the user tries to further move supporter toward the first position in the state in which the other of the regulators is hindered from moving due to contact with the other of the engaging portions, it is possible to prevent the engaging portion and the engaged portion from being engaged with each other only at one side portion of the supporter corresponding to the one of the regulators.

In the sheet conveying device, etc., constructed as described above, the first contact surfaces are formed on one of the regulators and the engaging portions while first contact portions are formed on the other of the regulators and the engaging portions. When the supporter is moved from the second position to the first position, the engaging portions move in a first direction relative to the regulators, so that the first contact surfaces come into contact with the first contact portions. After the first contact surfaces come into contact with the first contact portions, the engaging portions elastically deform in a second direction, so that the engaging portions further move in the first direction relative to the regulators while the first contact surfaces and the first contact portions slide with one another. The first contact surfaces incline at a first inclination angle with respect to the first direction, the first inclination angle being determined such that a contact pressure of the first contact surfaces and the first contact portions increases and an amount of elastic deformation of the engaging portions increases, with an increase in a relative movement of the regulators and the engaging portions in the first direction.

According to the sheet conveying device, etc., constructed as described above, when the supporter is moved from the second position to the first position, the contact pressure of the first contact portions and the first contact surfaces gradually increases. Consequently, even if the maximum contact pressure of the regulators and the engaging portions is the same, the supporter can be moved from the first position to the second position more smoothly than in a case in which a pressure equal to the maximum contact pressure acts immediately after the first contact surfaces and the first contact portions come into contact with one another.

In the sheet conveying device, etc., second contact surfaces are formed on one of the engaging portions and the engaged portions while second contact portions are formed on the other of the engaging portions and the engaged portions. When the engaging portions and the engaged portions are held in engagement with one another, the second contact portions are held in contact with the second contact surfaces and the engaging portions that are elastically deformed press the engaged portions in a third direction at a position at which the engaging portions are held in engagement with the engaged portions. The second contact surfaces incline at a second inclination angle with respect to the third direction, the second inclination angle being determined such that a biasing force by which the supporter is biased toward the first position increases with an increase in a pressing force by which the engaging portions press the engaged portions in the third direction.

According to the sheet conveying device, etc., constructed as described above, when the engaging portions and the engaged portions are held in engagement with one another, a part of the contact pressure that acts between the second contact portions and the second contact surfaces act in a direction in which the supporter is biased toward the first position. As a result, the supporter can be held in a state in which the supporter is biased in a direction toward the first position by the elastic force of the engaging portions, thereby preventing or reducing wobbling of the supporter.

In the sheet conveying device, etc., when the supporter is moved from the first position to the second position, the engaging portions move relative to the regulators in a fourth direction opposite to the first direction, and the second contact surfaces incline at a third inclination angle with respect to the fourth direction, the third inclination angle being larger than the first inclination angle.

According to the sheet conveying device, etc., constructed as described above, a force by which the supporter is moved toward the second position when the first contact portions and the first contact surfaces are held in contact with one another is smaller than a force by which the supporter is moved in the direction toward the first position when the second contact portions and the second contact surfaces are held in contact with one another. As a result, even though the magnitude of the elastic force generated by the engaging portions is the same, the supporter can be easily moved toward the first position when the first contact portions are held in contact with the first contact surfaces, and the supporter can be biased in the direction toward the first position effectively utilizing the elastic force of the engaging portions when the second contact portions are held in contact with the second contact surfaces.

In the sheet conveying device, etc., an exterior member is disposed outside the opposite ends, in the widthwise direction, of the supporter that is located at the first position, the supporter fitting inside the exterior member when the supporter is located at the first position, and a contact surface is formed on at least part of an outer edge of each of the regulators, the contact surface being contactable with the exterior member when the supporter is moved from the second position to the first position. The contact surface inclines with respect to a movement direction thereof, an inclination angle of the contact surface being determined such that, in an instance where the contact surface and the exterior member contact with each other when the supporter is moved from the second position to the first position, the regulators are guided inside the exterior member while the contact surface and the exterior member slide with each other.

According to the sheet conveying device, etc., constructed as described above, even if the outer edges of the regulators come into contact with the exterior member, the inclined contact surfaces contact the exterior member, so that the regulators are guided inside the exterior member. Therefore, even if the regulators and the exterior member are designed so as to be adjacent to each other to such an extent that the regulators and the exterior member can contact with each other, the regulators do not hinder the movement of the supporter, and the supporter can be moved smoothly.

What is claimed is:

1. A sheet conveying device, comprising:
   a base;
   a conveyor disposed in the base and configured to convey a sheet along a conveyance path;
   a supporter configured to be moved relative to the base so as to be movable between a first position and a second position, the supporter having a first surface and a second surface which is opposite to the first surface and on which a plurality of ribs are formed so as to protrude therefrom, the supporter being configured such that, when the supporter is located at the first position, the first surface partially defines an exterior surface of the sheet conveying device and such that, when the supporter is located at the second position, the sheet to be supplied to or output from the conveyor is supportable on the second surface;
   a pair of regulators one of which is provided at one of opposite ends of the supporter in a widthwise direction orthogonal to a conveying direction of the sheet and the other of which is provided at the other of the opposite ends of the supporter in the widthwise direction, the regulators protruding in a direction of protrusion of the ribs by an amount larger than an amount by which the ribs protrude, the regulators being configured to regulate a position, in the widthwise direction, of the sheet supported by the supporter;
   a pair of engaged portions each constituted by one of a recess and a hole formed in a corresponding one of the regulators; and
   a pair of engaging portions protruding from the base so as to correspond to the pair of engaged portions, the engaging portions being configured to engage with the engaged portions when the supporter is located at the first position and to disengage from the engaged portions when the supporter is located at a position that is shifted from the first position toward the second position.

2. The sheet conveying device according to claim 1, wherein, when the supporter is moved from the second position to the first position, the regulators come into contact with the engaging portions so as to elastically deform the engaging portions, and an amount of elastic deformation of the engaging portions is reduced when the engaged portions reach the engaging portions, so that the engaging portions and the engaged portions engage with one another.

3. The sheet conveying device according to claim 2, wherein the amount by which the regulators protrude is determined such that the supporter is moved together with the regulators by a distance in a period from a time point when the regulators come into contact with the engaging portions to a time point when the supporter reaches the first position, the distance being not smaller than a predetermined distance; and, wherein the predetermined distance is determined such that, in an instance where one of the regulators is movable while elastically deforming one of the engaging portions corresponding to the one of the regulators whereas the other of the regulators is hindered from moving due to contact with the other of the engaging portions corresponding to the other of the regulators, during a movement of the supporter from the second position to the first position, a further movement of the supporter toward the first position causes an increase in a force that is applied from the other of the regulators to the other of the engaging portions by elastic deformation of the supporter, so that the other of the regulators becomes movable while elastically deforming the other of the engaging portions before the one of the regulators moves beyond the predetermined distance.

4. The sheet conveying device according to claim 1, wherein first contact surfaces are formed on one of the regulators and the engaging portions while first contact portions are formed on the other of the regulators and the engaging portions, wherein, when the supporter is moved from the second position to the first position, the engaging portions move in a first direction relative to the regulators, so that the first contact surfaces come into contact with the first contact portions, wherein, after the first contact surfaces come into contact with the first contact portions, the engaging portions elastically deform in a second direction, so that the engaging portions further move in the first direction relative to the regulators while the first contact surfaces and the first contact portions slide with one another, and wherein the first contact surfaces incline at a first inclination angle with respect to the first direction, the first inclination angle being determined such that a contact pressure of the first contact surfaces and the first contact portions increases and an amount of elastic deformation of the engaging portions increases, with an increase in a relative movement of the regulators and the engaging portions in the first direction.

5. The sheet conveying device according to claim 1, wherein second contact surfaces are formed on one of the engaging portions and the engaged portions while second contact portions are formed on the other of the engaging portions and the engaged portions, wherein, when the engaging portions and the engaged portions are held in engagement with one another, the second contact portions are held in contact with the second contact surfaces, and the engaging portions that are elastically deformed press the engaged portions in a third direction at a position at which the engaging portions and the engaged portions are held in engagement with one another, and wherein the second contact surfaces incline at a second inclination angle with respect to the third direction, the second inclination angle being determined such that a biasing force by which the supporter is biased toward the first position increases with an increase in a pressing force by which the engaging portions press the engaged portions in the third direction.

6. The sheet conveying device according to claim 4, wherein second contact surfaces are formed on one of the engaging portions and the engaged portions while second contact portions are formed on the other of the engaging portions and the engaged portions, wherein, when the engaging portions and the engaged portions are held in engagement with one another, the second contact portions are held in contact with the second contact surfaces, and the engaging portions that are elastically deformed press the engaged portions in a third direction at a position at which the engaging portions and the engaged portions are held in engagement with one another, and wherein the second contact surfaces incline at a second inclination angle with respect to the third direction, the second inclination angle being determined such that a biasing force by which the supporter is biased toward the first position increases with an increase in a pressing force by which the engaging portions press the engaged portions in the third direction.

7. The sheet conveying device according to claim 6, wherein, when the supporter is moved from the first position to the second position, the engaging portions move relative to the regulators in a fourth direction opposite to the first direction, and wherein the second contact surfaces incline at a third inclination angle with respect to the fourth direction, the third inclination angle being larger than the first inclination angle.

8. The sheet conveying device according to claim 1, wherein an exterior member is disposed outside the opposite ends, in the widthwise direction, of the supporter that is located at the first position, the supporter fitting inside the exterior member when the supporter is located at the first position, wherein a contact surface is formed on at least part of an outer edge of each of the regulators, the contact surface being contactable with the exterior member when the supporter is moved from the second position to the first position, and wherein the contact surface inclines with respect to a movement direction thereof, an inclination angle of the contact surface being determined such that, in an instance where the contact surface and the exterior member contact with each other when the supporter is moved from the second position to the first position, the regulators are guided inside the exterior member while the contact surface and the exterior member slide with each other.

9. An image reading apparatus including a sheet conveying device configured to convey, along a conveyance path, a sheet whose image is to be read, wherein sheet conveying device includes:
a base;

a conveyor disposed in the base and configured to convey a sheet along the conveyance path;

a supporter configured to be moved relative to the base so as to be movable between a first position and a second position, the supporter having a first surface and a second surface which is opposite to the first surface and on which a plurality of ribs are formed so as to protrude therefrom, the supporter being configured such that, when the supporter is located at the first position, the first surface partially defines an exterior surface of the sheet conveying device and such that, when the supporter is located at the second position, the sheet to be supplied to or output from the conveyor is supportable on the second surface;

a pair of regulators one of which is provided at one of opposite ends of the supporter in a widthwise direction orthogonal to a conveying direction of the sheet and the other of which is provided at the other of the opposite ends of the supporter in the widthwise direction, the regulators protruding in a direction of protrusion of the ribs by an amount larger than an amount by which the ribs protrude, the regulators being configured to regulate a position, in the widthwise direction, of the sheet supported by the supporter;

a pair of engaged portions each constituted by one of a recess and a hole formed in a corresponding one of the regulators; and a pair of engaging portions protruding from the base so as to correspond to the pair of engaged portions, the engaging portions being configured to engage with the engaged portions when the supporter is located at the first position and to disengage from the engaged portions when the supporter is located at a position that is shifted from the first position toward the second position.

10. An image reading apparatus including a sheet conveying device configured to convey, along a conveyance path, a sheet whose image is to be read, wherein sheet conveying device includes:

a base;

a conveyor disposed in the base and configured to convey a sheet along a conveyance path;

a supporter configured to be moved relative to the base so as to be movable between a first position and a second position, the supporter having a first surface and a second surface which is opposite to the first surface, the supporter being configured such that, when the supporter is located at the first position, the first surface partially defines an outer surface of the sheet conveying device and such that, when the supporter is located at the second position, the sheet to be supplied to or output from the conveyor is supportable on the second surface;

a pair of regulators one of which is provided so as to protrude from one of opposite ends of the supporter in a widthwise direction orthogonal to a conveying direction of the sheet and the other of which is provided so as to protrude from the other of the opposite ends of the supporter in the widthwise direction, the regulators being configured to regulate a position, in the widthwise direction, of the sheet supported by the supporter;

a pair of engaged portions each constituted by one of a recess and a hole formed in a corresponding one of the regulators; and a pair of engaging portions protruding from the base so as to correspond to the pair of engaged portions, the engaging portions being configured to engage with the engaged portions when the supporter is located at the first position and to disengage from the engaged portions when the supporter is located at a position that is shifted from the first position toward the second position, wherein, when the supporter is moved from the second position to the first position, the regulators come into contact with the engaging portions so as to elastically deform the engaging portions, and an amount of elastic deformation of the engaging portions is reduced when the engaged portions reach the engaging portions, so that the engaging portions and the engaged portions engage with one another, wherein the amount by which the regulators protrude is determined such that the supporter is moved together with the regulators by a distance in a period from a time point when the regulators come into contact with the engaging portions to a time point when the supporter reaches the first position, the distance being not smaller than a predetermined distance, and wherein the predetermined distance is determined such that, in an instance where one of the regulators is movable while elastically deforming one of the engaging portions corresponding to the one of the regulators whereas the other of the regulators is hindered from moving due to contact with the other of the engaging portions corresponding to the other of the regulators, during a movement of the supporter from the second position to the first position, a further movement of the supporter toward the first position causes an increase in a force that is applied from the other of the regulators to the other of the engaging portions by elastic deformation of the supporter, so that the other of the regulators becomes movable while elastically deforming the other of the engaging portions before the one of the regulators moves beyond the predetermined distance.

* * * * *